Patented Nov. 7, 1922.

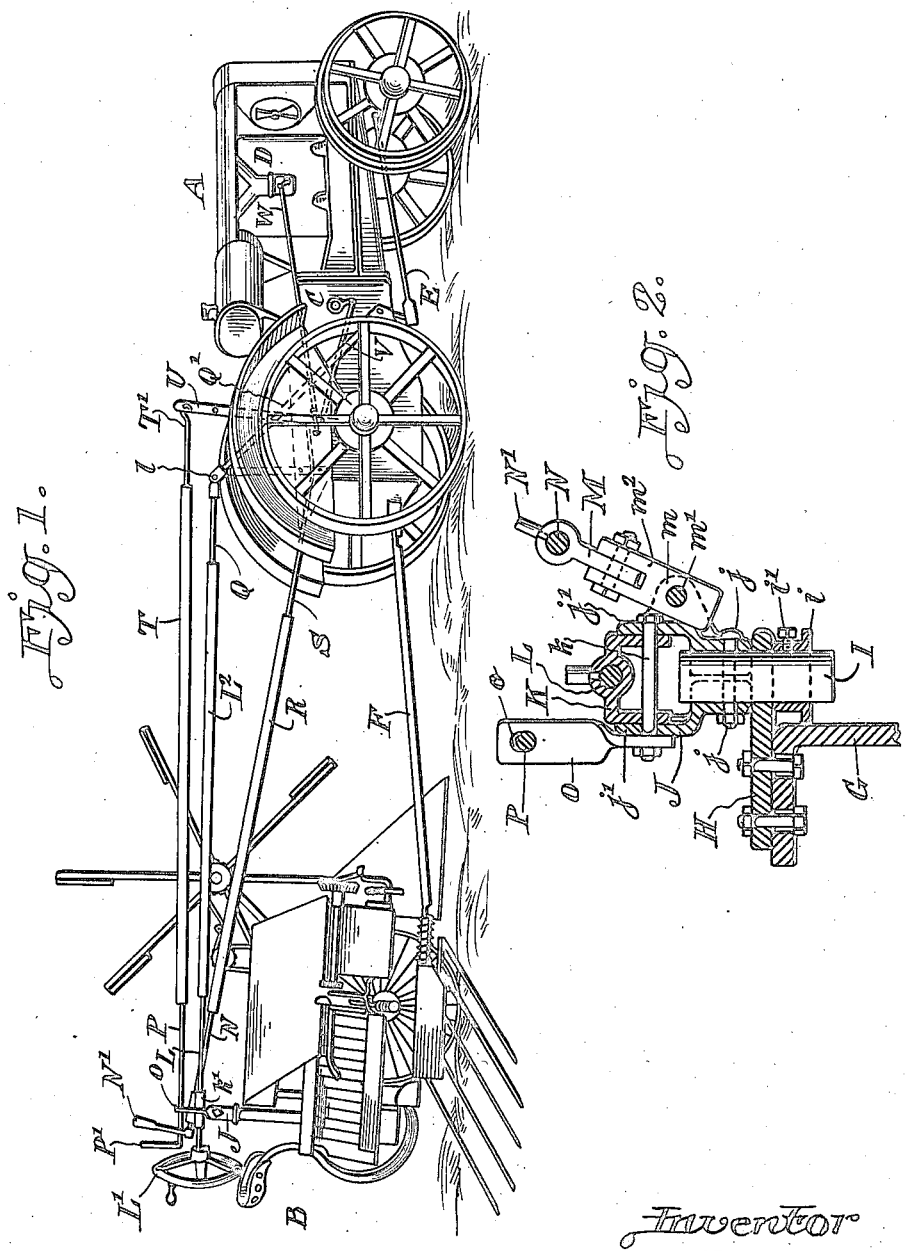

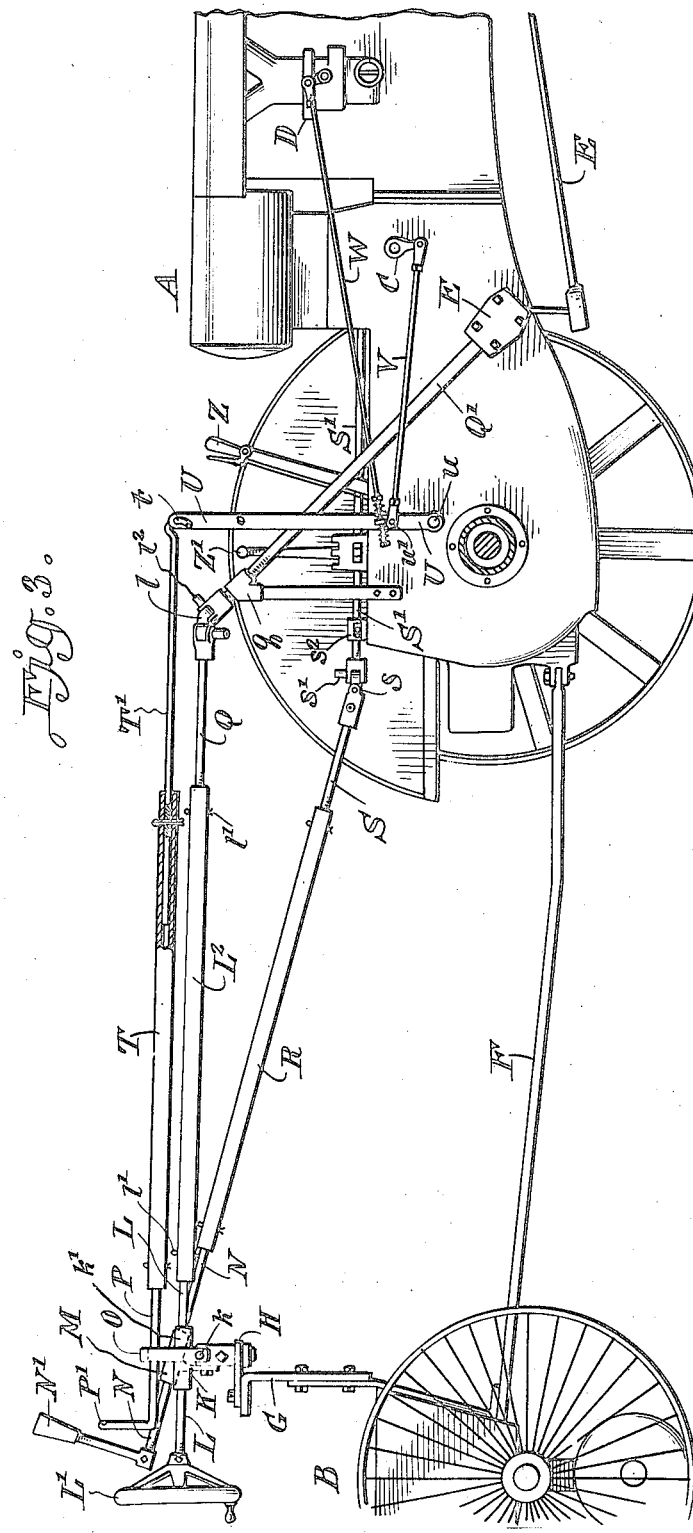

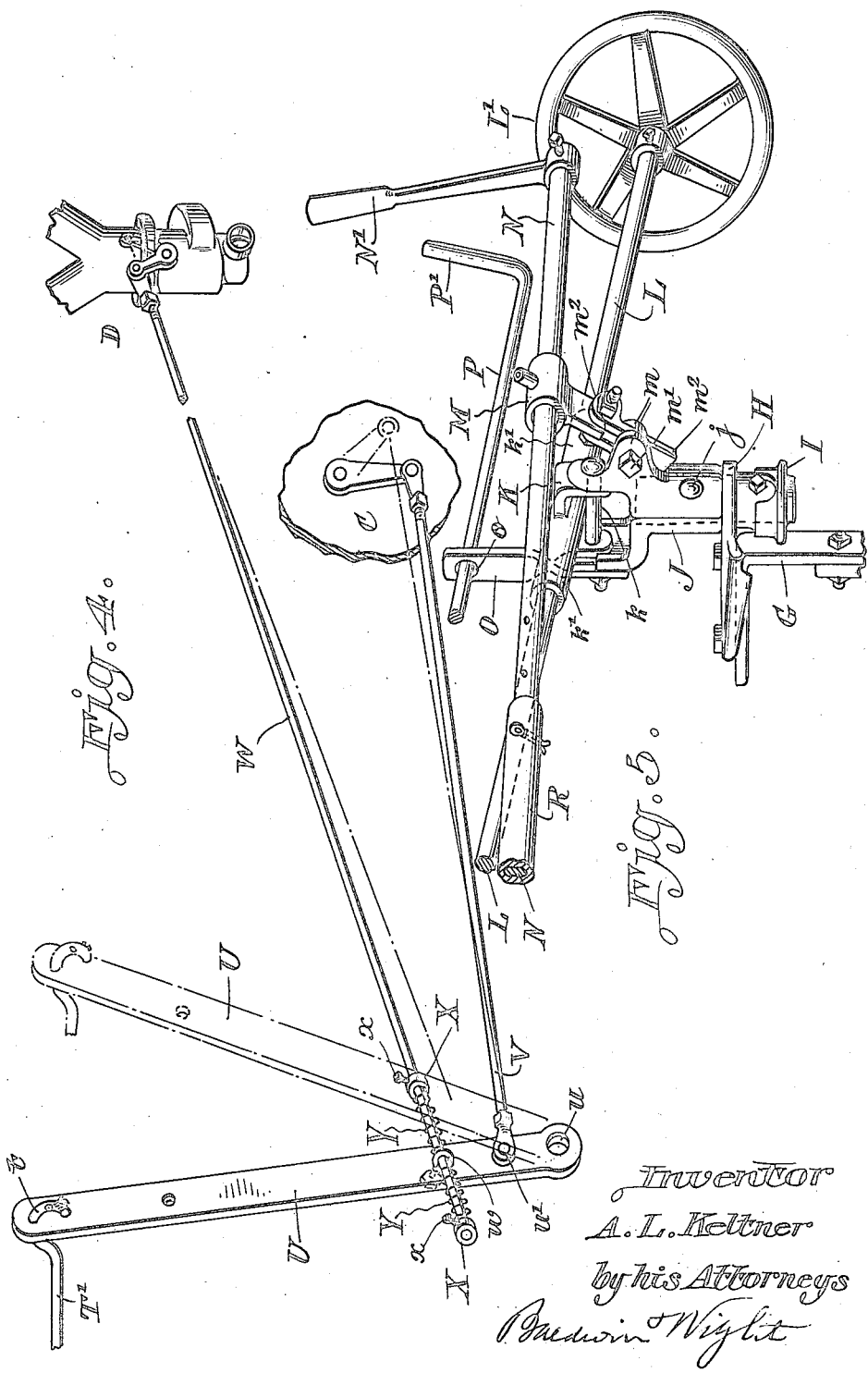

1,434,389

UNITED STATES PATENT OFFICE.

AMOS LEA KELTNER, OF ELDORADO, KANSAS.

TRACTOR-CONTROLLING MECHANISM.

Application filed June 16, 1921. Serial No. 478,012.

*To all whom it may concern:*

Be it known that I, AMOS LEA KELTNER, a citizen of the United States, residing at Eldorado, in the county of Butler and State of Kansas, have invented certain new and useful Improvements in Tractor-Controlling Mechanism, of which the following is a specification.

According to this invention improved mechanism is provided for controlling a tractor from the seat of a farm implement or other machine or vehicle drawn by a tractor whereby the latter may be steered, its gears shifted, its clutch thrown in and out at will and its throttle opened and closed simultaneously with the opening and closing of the clutch. This is done by means of rods and levers connected with the steering mechanism, the clutch, throttle and the gear-shifting mechanism of the tractor, and operated by mechanism on the machine or vehicle drawn within convenient reach of the driver. The mechanism is so constructed that it may be conveniently adjusted for varying conditions and it has such flexibility as to accommodate itself to any quality of service.

In the accompanying drawings illustrating my invention:—

Figure 1 is a side elevation of a tractor and a harvesting machine with my improvements applied.

Figure 2 is a detail sectional view of the universal joints of the supports for the operating rods which are mounted on a bracket attached to the implement.

Figure 3 is a side elevation of the mechanism, showing how it is connected with a seeding machine.

Figure 4 is a view on an enlarged scale, showing the connections to the clutch-operating and the throttle mechanism.

Figure 5 is a perspective view, illustrating the mechanism within reach of the driver for performing the several operations.

In the drawings A indicates a tractor and B an implement or machine drawn by the tractor. Figure 1 shows a harvesting machine and Figure 2 part of a seeding machine.

The throttle of the tractor is indicated at D, the clutch mechanism at C and the steering mechanism at E. The machine or implement is connected with the tractor by a draft-rod F in the usual way.

A bracket G is secured to the implement in any suitable way near the driver's seat, and this bracket supports bearings for the rods which shift the gears, steer the tractor and operate the clutch and throttle. These bearings are formed in castings most clearly shown in Figs. 2 and 5. A plate H is adjustably secured to the bracket G in the manner shown in Fig. 2, and through this plate extends a short steel rod I, carrying at its lower end below the plate a sleeve $i$ secured to the rod by a set screw $i'$. Resting on the plate H and secured to the rod I is a two-part casting J held on the rod by a bolt $j$ which extends through said rod. The casting J has two upwardly projecting arms $j'$ between which is mounted a bearing member K which is pivotally connected to the arms by a bolt $k$. As shown in Fig. 5 the member K is formed with a sleeve $k'$ which provides an elongated bearing for a rod L, carrying a steering wheel $L'$. In this way a universal coupling is provided, i. e., one which permits the steering rod to be moved to the right or to the left and also vertically. On one side of the casting J there are lugs $m$, to which is pivotally connected at $m'$ a bifurcated member $m^2$ to which is pivotally connected a bearing member M, through which extends a rod N, having a handle $N'$ by means of which the gears may be shifted. On the opposite side of the casting there is a bearing member O which is pivotally connected with the casting by the bolt $k$ and it has an elongated opening $o$ at its upper end through which extends a rod P which operates the clutch and the throttle. The rod P is provided with a handle $P'$ by means of which the rod may be pushed and pulled to operate the clutch and the throttle.

The steering rod L is connected by a sleeve $L^2$ with a rod Q, in turn connected by a universal joint $l$ with a rod $Q'$ extending through a bearing $q$ and connected at its lower front end with means E for operating the steering devices. The rods L and Q are adjustably connected with the sleeve $L^2$ by cotter pins $l'$ in order that the connection between the steering wheel on the implement and the steering mechanism on the tractor may be adjusted to accommodate different conditions.

The gear-shift rod N is connected by a sleeve R with a rod S having a universal joint $s$ with a rod $S'$ which operates the gears. The sleeve R is adjustably connected with the rods N and S so that the connection between the gear-operating handle and the gears on the tractor may be adjusted.

The rod P which operates the clutch and the throttle is connected by a sleeve T with a rod T', pivotally connected at $t$ to the upper end of a lever U, the lower end of which is pivoted at $u$ to the frame of the tractor. The sleeve T is adjustably connected with the rods P and T' whereby the length of the connection between the operating handle P', the throttle and the clutch may be lengthened or shortened.

The lever U is connected near its lower end at $u'$ to a rod V extending to the clutch-operating mechanism C and the throttle D is connected by a rod W with the lever U just above its connection with the rod V. This latter connection is made by passing the rod W through an eye $w$ on the lever U and placing springs Y on the rod on opposite sides of the eye between collars X adjustably secured to the rod by set screws $x$. By this arrangement when the handle T' is operated to shift the clutch the throttle is at the same time operated to either open or close. This results in a great advantage as there is no danger of the engine running free after the clutch is shifted or opened and likewise the throttle is opened and the engine started as soon as the clutch is closed.

It will be observed that all of the necessary operations for controlling the tractor are performed from the driver's seat. The connections may be adjusted to correspond with variations of distance between the tractor and the machine or the implement drawn, and there is such flexibility in the connections that no inequalities in the ground traversed effect the efficient operation of the mechanism, and no undue strain is imposed thereon. The mechanism is positively operated by rods and levers, no rope, chains, wires or the like being employed as in many other machines.

The mechanism may be readily applied to various kinds of implements, machine or vehicles and to various kinds of tractors.

The universal joints may be lubricated in any suitable way; for instance, an oiler is indicated at $l^2$ for the joint $l$ and at $s'$ for the joint $s$. The rod S' passes through a bearing $s^2$ which may also be suitably lubricated.

The lever Z, shown in Fig. 3, is a hand lever for operating the clutch when not operated from the implement drawn. Z' indicates a hand-operated gear-shifting lever of the usual construction.

As before stated, the tractor may be made to pull machines and vehicles of various kinds. Such machines may, for convenience, be called "trailers" and in the claims where a trailer is specified it will be understood that reference is made to agricultural machines of various kinds and vehicles of various descriptions.

I claim as my invention:—

1. The combination of a tractor provided with a clutch and a throttle, of an upright lever pivotally mounted directly on the tractor, a rod extending from said lever to the clutch mechanism, a rod connected to the throttle, a yielding connection between the throttle rod and said lever, a trailer, an operating handle thereon, and extensible connections between said handle and said lever.

2. A trailer adapted to be attached to a tractor and provided with handles for steering, for shifting the gearing, and for operating the clutch and the throttle of the tractor, a bracket on the trailer, a casting supported on the bracket and adapted to turn relatively thereto about a vertical axis, a steering rod, a bearing member therefor pivoted to the casting to move about a horizontal axis, a rod for operating the gearing, a bearing member therefor supported by the casting and having a universal joint therewith, and a bearing member for the clutch and throttle mechanism pivotally connected with said casting.

3. A trailer adapted to be connected with a tractor and having handles for steering, for gear-shifting, and for operating the clutch and the throttle, a bracket secured to the trailer, a casting having a pivotal connection with the bracket, a steering rod, a bearing member for said rod connected with the casting to move about a horizontal axis, a rod for operating the gears, a bearing member therefor pivotally connected with the casting to move about axes at right angles to each other, and a bearing for the clutch and throttle-operating rod pivotally connected with said casting.

4. The combination with a tractor provided with steering mechanism, gear-shift mechanism, clutch mechanism and a throttle, of a trailer, a draft connection between the trailer and the tractor, and a single bracket on the trailer carrying universally mounted steering means connected with the steering mechanism on the tractor, universally mounted operating means connected with the gear-shift mechanism on the tractor, and pivotally mounted means for coincidently operating the clutch and the throttle.

In testimony whereof, I have hereunto subscribed my name.

AMOS LEA KELTNER.